United States Patent [19]
Cooper et al.

[11] 3,744,825
[45] July 10, 1973

[54] TUBE JOINT COUPLING DEVICE

[75] Inventors: Gary M. Cooper, Fort Worth, Tex.;
Bruce Gilbert, San Diego, Calif.;
James M. Estes, Fort Worth, Tex.

[73] Assignee: General Dynamics Corporation, Ft. Worth, Tex.

[22] Filed: Apr. 27, 1972

[21] Appl. No.: 248,194

[52] U.S. Cl.................... 285/407, 285/367, 24/279
[51] Int. Cl............................................. F16i 23/00
[58] Field of Search.................... 285/365, 366, 367, 285/407, 409, 410, 411, 414, 419, 373; 24/22, 279, 263 DL

[56] References Cited
UNITED STATES PATENTS

| | | | |
|---|---|---|---|
| 3,661,409 | 5/1972 | Brown et al. | 285/367 |
| 3,016,249 | 1/1962 | Contreras et al. | 285/367 |
| 2,362,454 | 11/1944 | Damsel | 285/366 |
| 1,194,209 | 8/1916 | Middaugh | 24/263 DL |
| 1,093,868 | 4/1914 | Leighty | 285/367 |
| 565,698 | 8/1896 | Sparks | 285/419 |
| 142,388 | 9/1873 | Goble | 285/419 |

*Primary Examiner*—Mervin Stein
*Assistant Examiner*—Alexander Grosz
*Attorney*—Charles C. M. Woodward

[57] ABSTRACT

A tube joint coupling device particularly adapted for use with V-flange "Conoseal" type tube joints which comprises a pair of C-shaped clamps hingedly connected on one end and having means on the other end for mutually cooperative engagement and locking and means providing for bottoming out of the two halves without regard to torque when the clamps have reached the "secured" position, each C-shaped clamp having a V-groove providing for wedging or camming the flanges of the tubes to be jointed, the camming action of the V-groove being cooperatively assisted by an approach ramp, the V-groove having a "full engagement" portion encompassing substantially 120° of the circumference of the V-flanges in two equal and opposite segments, whereby the coupling eliminates virtually all installation errors and improves the joint effectivity attainable with presently utilized devices.

3 Claims, 11 Drawing Figures

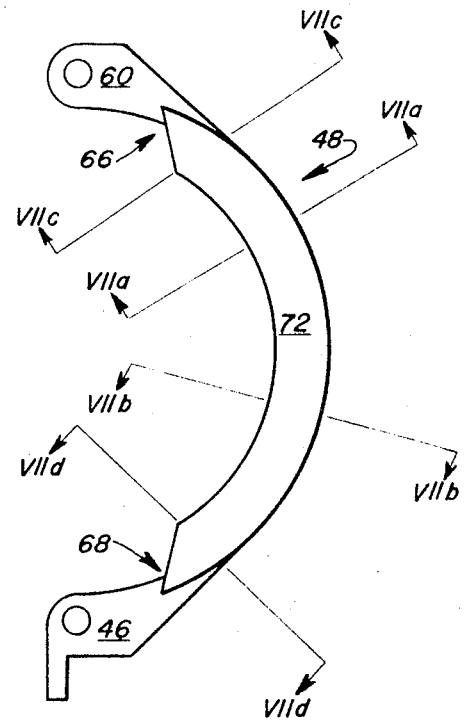
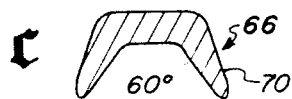
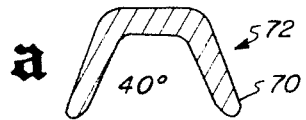
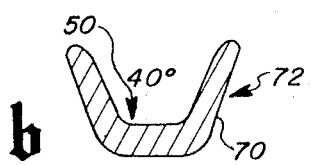
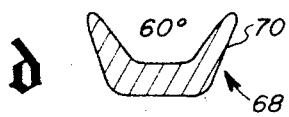
Fig. 7
Fig. 6
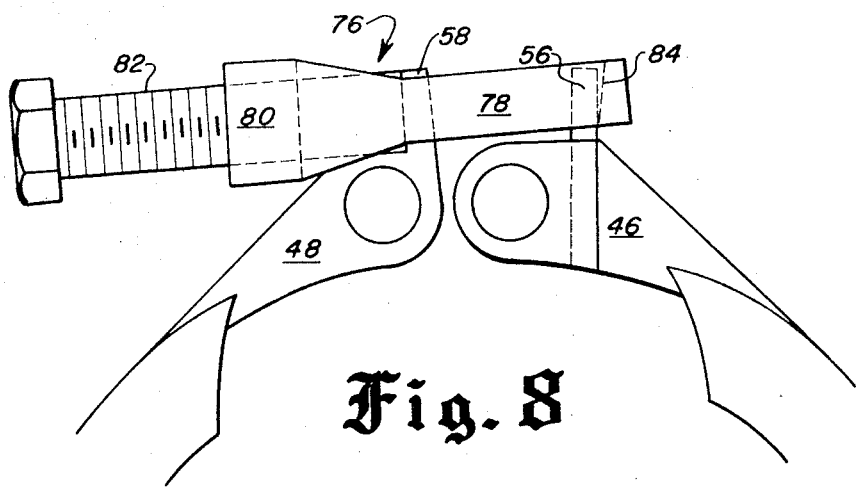
Fig. 8

TUBE JOINT COUPLING DEVICE

DESCRIPTION OF THE PRIOR ART

This invention relates to tube joint couplings.

More particularly, the invention relates to couplings for V-flange type tube joints subject to high pressures.

The common practice within the aerospace industry is to join segments of jet engine bleed air ducting and other air ducting systems by utilization of a device almost uniformly referred to as a "Marman Clamp." Such a V-band coupling device is used in conjunction with a patented metallic seal known in the art as "Conoseal" (U.S. Pat. No. 2,992,840) disposed between special V-flanged duct ends to form a sealed joint.

The "Conoseal" is a unique device which does not function in the normal sense as a gasket between flanges. Instead, it provides sealing contact at its inside and outside edges. The seal is trapped between cylindrical steps in the mating flanges. As the mating and opposing flanges are forced toward each other the "Conoseal," which is a truncated cone, is plastically deformed and forced against the cylindrical barriers thus forming an effective metal to metal seal.

Driving force on the V-flanges is provided by the mating V-groove in the V-band coupling or clamp. As the clamp is tightened the flanges of the mating tubes are forced into the groove and drawn closer together. Excessive deformation of the "Conoseal" by unnecessary and undesired additional tightening or torquing of the clamp does not improve the seal but on the contrary degrades it materially, although many installers of this device are inclined to use excessive force. This tendency to utilize excessive force results in a ruptured or structurally unsound joint which will fail during use with resultant loss of aircraft and sometimes personnel.

A trunnion mounted T-bolt and lock nut assembly is used to tighten the clamp and draw the flanges into the proper and desired position. A specific torque force, experimentally determined for each coupling size, is utilized for installation control.

Torque at the coupling nut is a poor indication of flange position since it is indirect, being influenced by a compounding of variables. Among these involved variables are: (1) thread friction, (2) flange and groove friction, and (3) flange alignment and rigidity. The aforementioned design weakness may be partially offset in use by careful and time consuming torque measurements as above indicated.

The prescribed installation procedure for such devices provides several opportunities for error. For instance, judgment is involved in selecting an undamaged clamp since such clamps are normally classified as a "reuseable item," and in deciding that the entire joint structure is complete and valid following installation. The correct procedure contradicts or deviates from the inclinations of the installers since they are inclined to assume that the clamp should be concentric with the flanges and that the flanges should be drawn together with a sealing force against the gasket. Generally speaking, it is understood in the absence of special training that those "learned" or natural assumptions are not correct and that their effectuation does not only improve but damages the integrity of the installation. Any further effort to "improve" the installation, i.e., to make it "estheticaliy" pleasing or natural appearing, by inherent excessive force will damage the clamps and cause subsequent failure of the joint. The fact that the usual "learning" does not apply to installation of this type clamp constitutes a very serious design weakness.

General and continued use of the "Marman Clamp" attest to its current reputation as being the most effective and reliable installation to date. However, investigation of numerous failures and severity of the consequences resultant from these failures because of the critical areas of application, have indicated a serious need for the improved device of the present invention. Failure analyses uniformly indicate improper installation in prior art devices as the cause of failure, specifically over-torquing or over-tightening of the clamp. Such a clamp damaged in installation, or improperly installed, may fail under the additional stresses imposed by operational loads and inherently produces severe or catastrophic damage to an entire system of an aircraft with possible resultant loss of life.

It may be summarized that the presently utilized tube joint coupling devices are disadvantageous in that:

(1) To obtain the desired force against the seal, a measured torque force on the coupling nut is specified. This method is unreliable due to the wide variation in thread friction and because of possible interference with flange movement or improper installation of the coupling, (2) improper installation of the coupling permits undesired separation of the joint, (3) a single failure of the T-bolt, the retaining band or the latching mechanism on the clamp permits joint separation, (4) installation of the current V-band coupling requires excessive thread travel of the coupling nut which may result in thread damage and variation in thread friction during installation. Premature binding of the nut due to thread friction, i.e., galling, could result in an open or incomplete coupling installation.

The invention hereinafter completely described and explained overcomes the inherent fallacies and design shortcomings of such presently existing tube coupling devices and either obviates or diminishes the problems associated with such tube coupling devices which have plagued industry for many years.

In view of the inadequacies of the presently utilized tube joint coupling devices, the salient object of the hereinafter specifically explained invention is to provide a more structurally reliable coupling for the industry standard "Conoseal" type tube joint with standard V-shaped tube flanges.

Another object is to provide a device capable of being installed without the requirement for a torque wrench.

A further object of this invention is to provide a coupling device which is conducive to visual inspection for positive evidence of correct, complete and secure coupling installation.

Still another object of this invention is the provision of a highly effective and efficient coupling device which minimizes installation time, weight and required space.

A still further object of this invention is to provide a coupling device which is more economically produced, more easily installed and is much more susceptible to a definitive inspection.

An additional object of this invention is to provide a structurally secure coupling device which is virtually incapable of being installed incorrectly.

Other objects and advantages of this invention will become readily apparent from a consideration of the following description, appended claims and accompanying drawings, the invention will be readily understood by those versed in the art when taken in context of the following specification and related drawings wherein:

FIG. 6 is an elevational side view of one of the clamp sections of the invented device showing the camming and ramp sections;

FIGS. 7a through 7d are sectional elevational views of the C-clamp of FIG. 6 taken along the lines a—a through d—d thereof; and FIG. 8 is a partial elevational view of the clamp of the present invention showing a means for closing the clamp against tube-joint resistance.

Figure 1:
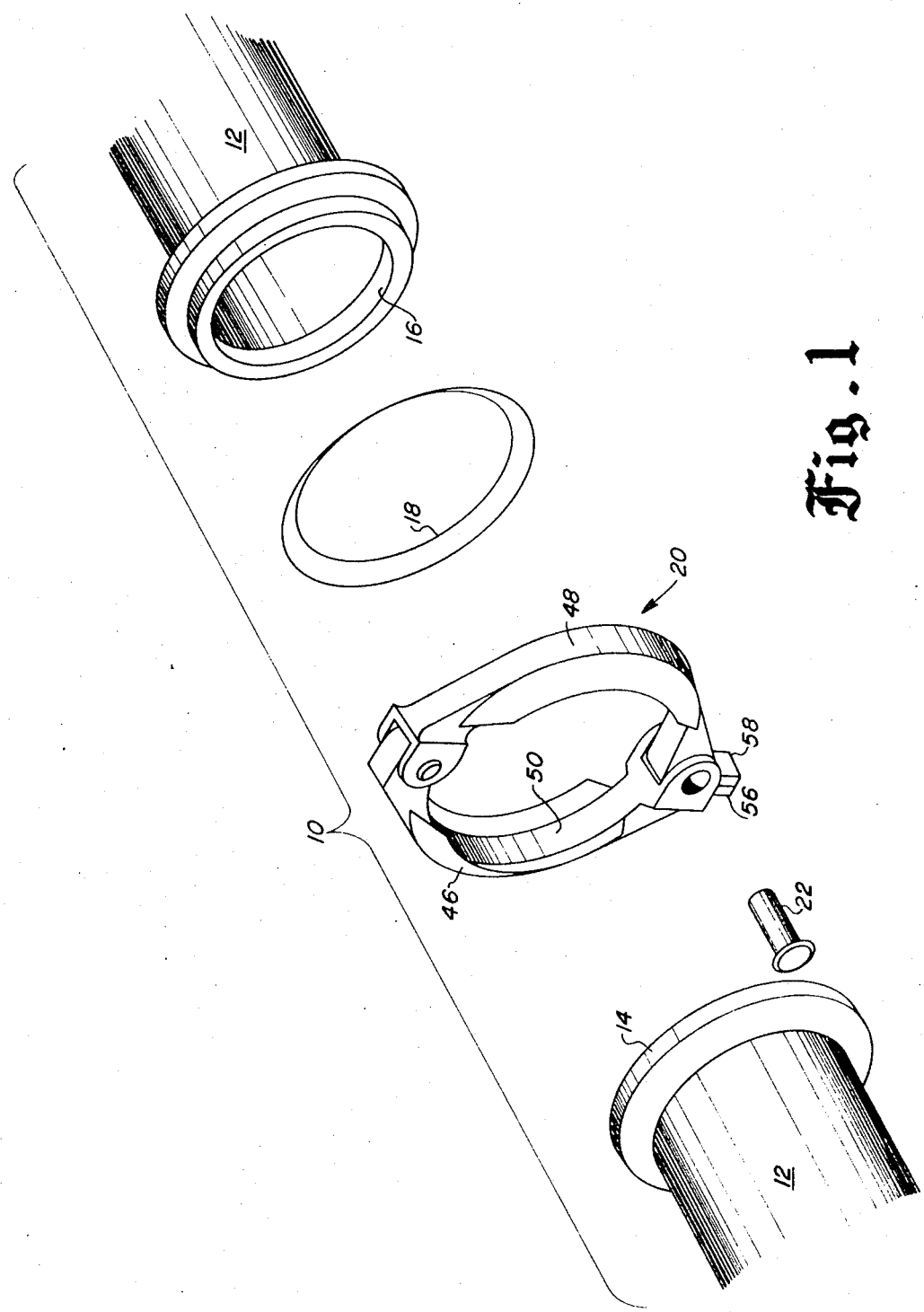
FIG. 1 is an isometric exploded view of the tube joint coupling of the present invention.

Referring now to FIG. 1 there is shown an exploded isometric view of tube joint 10 employing the clamp of the present invention. Each tube 12 is equipped with a circular flange, one of which is a female flange 14 and the other of which is a male flange 16. Gasket 18 is fitted between flanges 14, 16, and when these parts are in position, coupling 20 is placed around the joint 10, closed and retained by pin 22, as subsequently described in detail.

The coupling most widely utilized by industry at the present time is known as the "Marman" type coupling device. An explanation of how it works and the precautions which must be taken into account during its installation would serve to best illustrate the improvements offered by the coupling of the present invention. Therefore, reference now being had to FIG. 2, there is shown an isometric view of a "Marman" type coupling 24. It may be seen that coupling 24 is composed of strap 26 to which are spotwelded three V-retainer segments 28. Also affixed to strap 26 is T-bolt 30, trunnion 32 and quick-coupler latch 34.

Marman type coupling 24 is installed by spreading coupling 24 and slipping it over the flanged tube or ducting 12. With Marman type coupling it is critical that coupling 24 not be overspread, although such overspreading is easily done. When coupling 24 is overspread, strap 26 tends to become kinked or warped and the spotwelds retaining V-retainer segments 28 are weakened. A coupling 24 in this condition is no longer useable because it becomes structurally unreliable, although this condition, unless gross, is extremely difficult to discern. After the tube flanges 14, 16 are properly positioned, coupling 24 is brought into position over the tube flanges 14, 16, pressed around them and T-bolt 30 is engaged in quick coupler latch 34. Coupling nut 36 may be initially, or partially tightened with a small socket wrench. At this point one of the main problems of this type coupling 24 becomes readily apparent. Nut 36 on T-bolt 30 of coupling 24 has a required torque value and for final tightening to this required torque value it is necessary to use a torque wrench, although even the use of a torque wrench does not assure the proper seating due to the above-noted variables inherent in the coupling. It is very important requirement that coupling nut 36 not be overtorqued, however, as important as it is, it is frequently overtorqued by installation personnel. This results in a structurally unsound joint.

Figure 3:
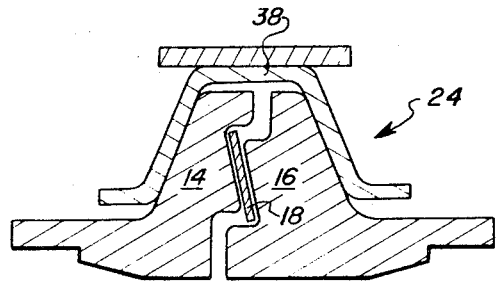
FIG. 3 is a partial sectional view in elevation of the completed tube joint of the device of FIG. 2 when properly made.

Referring now to FIG. 3, there is shown a partial sectional view in elevation of the upper portion of a tube joint. In this FIG. 3, gasket 18 is shown held in position between flanges 14, 16 by a Marman coupling 24 having the proper amount of torque applied thereto. In will be noted that there is a gap 38 between the inner diameter of the coupling 24 and the outer diameter of flanges 14, 16.

Figure 4:
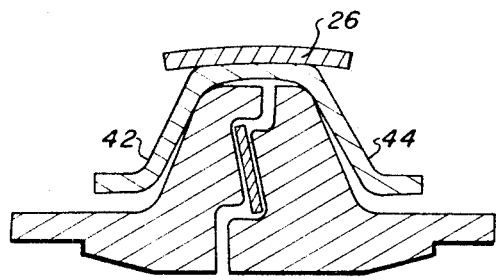
FIG. 4 is similar to FIG. 3 but shows an improperly installed coupling of the prior art.

As opposed to FIG. 3, you are referred next to FIG. 4 which is a partial sectional view in elevation of the same tube joint portion as in FIG. 3 with the exception that here there is shown the result of excessive torque force applied to the state of the art joint. It should be noted that band 26 of Marman type coupling 24 has "crowned" or bowed. This deformation weakens the spotwelding which joins band 26 to retainer segments 28, FIG. 2, of coupling 24 and leads to breakage and resultant often catastrophic damage. Also, in the overtorqued condition, the retainer portion 42 of coupling 24 has bottomed out against flanges 14, 16 and the retainer legs, such as designated at 44, have spread out.

Even if the correct torque is applied to nut 36 (as illustrated by the configuration in FIG. 3) it is standard installation procedure in the industry to "equalize" clamping tension by lightly tapping the circumference of the coupling with a light mallet. As will be illustrated subsequently, use of the novel coupling herein described eliminates this very imprecise method of endeavoring to secure a desired seating.

Users of the Marman clamp are instructed that, after initial tightening of the coupling nut with a socket wrench for instance, they are to utilize the torque wrench to further tighten the coupling nut to a specified percentage of maximum ultimate torque for that particular coupling. At this point they are advised to tap around the outer periphery of the coupling with a rubber or plastic mallet as above noted to distribute band tension, after which step they resume use of the torque wrench to obtain the desired degree of torque.

As will be shown subsequently, Applicants' coupling does not require use of a torque wrench and is incapable of being overstressed, thus overcoming or obviating the tendency of installing-personnel to excessively tighten or deform the coupling. This results in minimization of faulty couplings with accompanying economy and fewer failures.

The instant coupling device of the present invention assures both proper seating and desired pressure on the joint simply and without many of the installation steps previously required.

Figure 5:
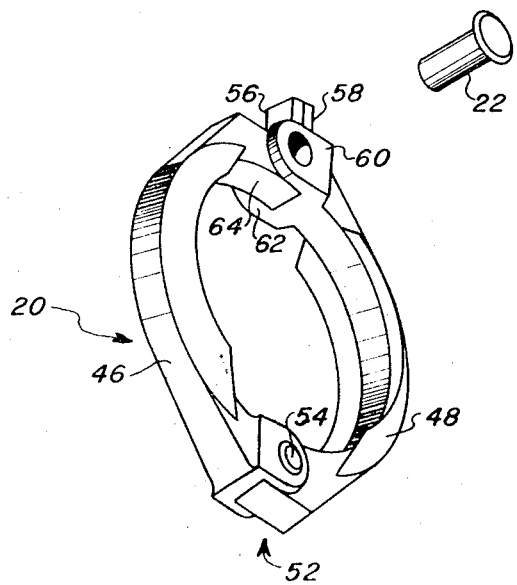
FIG. 5 is an isometric view of the coupling of FIG. 1 omitting the tubes.

Referring again to FIG. 1 there is shown a partially exploded isometric view of Applicants' coupling 20. Coupling 20 consists of two, basically identical, C-shaped members 46, 48, both of which have a V-shaped channel 50 on their respective inner peripheries. These C-shaped members 46, 48 cooperate with the flanges 14, 16 to provide the desired sealing effect. The C-shaped members 46, 48 are joined to one another at one end 52 (see FIG. 5) by a permanently installed hinge pin 54. This hinge pin 54 permits the installer to apply coupling 20 around the joint (not shown in FIG. 5) without the stresses which are imposed on the Marman type clamp strap 26 under similar installation circumstances. This prevents the potential damage to the coupling integrity which must be confronted when using the presently utilized "Marman" clamp and also makes the installation procedure much easier.

The invented coupling 20 obviates the requirement for any torque measurement during installation by providing the C-shaped members 46, 48 with tips 56, 58 respectively so positioned that when they meet, the desired position or relationship is afforded to the tube joint flanges. Meeting of tips 56, 58 also aligns locking holes in ears 60, 62 of C-member 48 with locking hole in retaining bar 64 of member 46 so that pin 22 may be easily inserted to retain coupling 20 in the desired position. Since in use coupling 20 is under expansion pressure from joint 10 (not shown this figure), pin 22 is retained in position by friction. As a general practice, however, a cotter pin or wire (not shown) may be inserted through pin 22 to furnish a fail safe retention capability.

The internal configuration of V-shaped channel 50 is perhaps best explained by reference to FIGS. 6 and 7, the former an elevational view of C-shaped member 48 and the latter sectional views taken along the section lines VIIa through VIId of FIG. 6. "Working" ends 66 and 68 of member 48 are flared at about 60° (as shown in FIG. 7c and 7d) and have a comparatively short lip 70. This flare of approximately 60° gradually and uniformly diminishes to a flare of about 40° while lip 70 correspondingly increases in length to the portion 72 of member 48 between sections a and b, at which point the cross-section of member 48 is as shown in FIG. 7a and b. In channel section segment 72 of member 48 the cross-section configuration remains constant for approximately 60° of arc.

This widening or flaring cross-section creates a flared guide which affords the desired cammed fit of the tube flanges 14, 16 to form a properly seated fitting. The uniform channel section 72 of member 48 serves to retain flanges 14, 16 after the flanges are guided into the desired mating relationship. Since flanges 14, 16 of the tube elements to be coupled are guided into a perfect mating by the flared V-shaped channel 50 and retained by section 72 (and its counter-part on C-shaped member 46) in the desired relationship, it is no longer necessary to tap around the joint with a mallet to assure the proper seating or relationship. Thus a step in the joining procedure which was formerly required during installation of the prior art clamp is obviated by the present invention. Since this step frequently caused overloading of the coupling with its consequent failures, its elimination is of utmost benefit.

Thus referring again to FIG. 1, it is seen that the invented coupling 10 assures the proper desired seating relationship of the flanges 14, 16 and gasket element 18 and further assures the correct tension of coupling 20 on tube joint 10 because of the cooperative relationship established by the bottoming out of tips 56, 58 on C-members 46, 48 and the relationship thereto of channel 50 and lip 70, 72. This relationship and "bottoming out" renders it physically impossible for even the most unskilled to overtighten the coupling.

Referring still to FIG. 1, it should be recognized that, after coupling 20 is placed around joint 10, there may be required some degree of force on tips 56, 58 in order to effect the bottoming out noted above of tips 56, 58 since joint 10 must be under some degree of pressure in order to be an effective sealing means and normally this pressure will increase with increasing size. As a general rule in relatively large sections it requires more pressure than can feasibly be introduced manually, therefore some other method of "bottoming out" tips 56, 58 should be used in order to align the locking holes in ears 60, 62 with that of bar 64 to permit insertion of pin 22.

Figure 2:
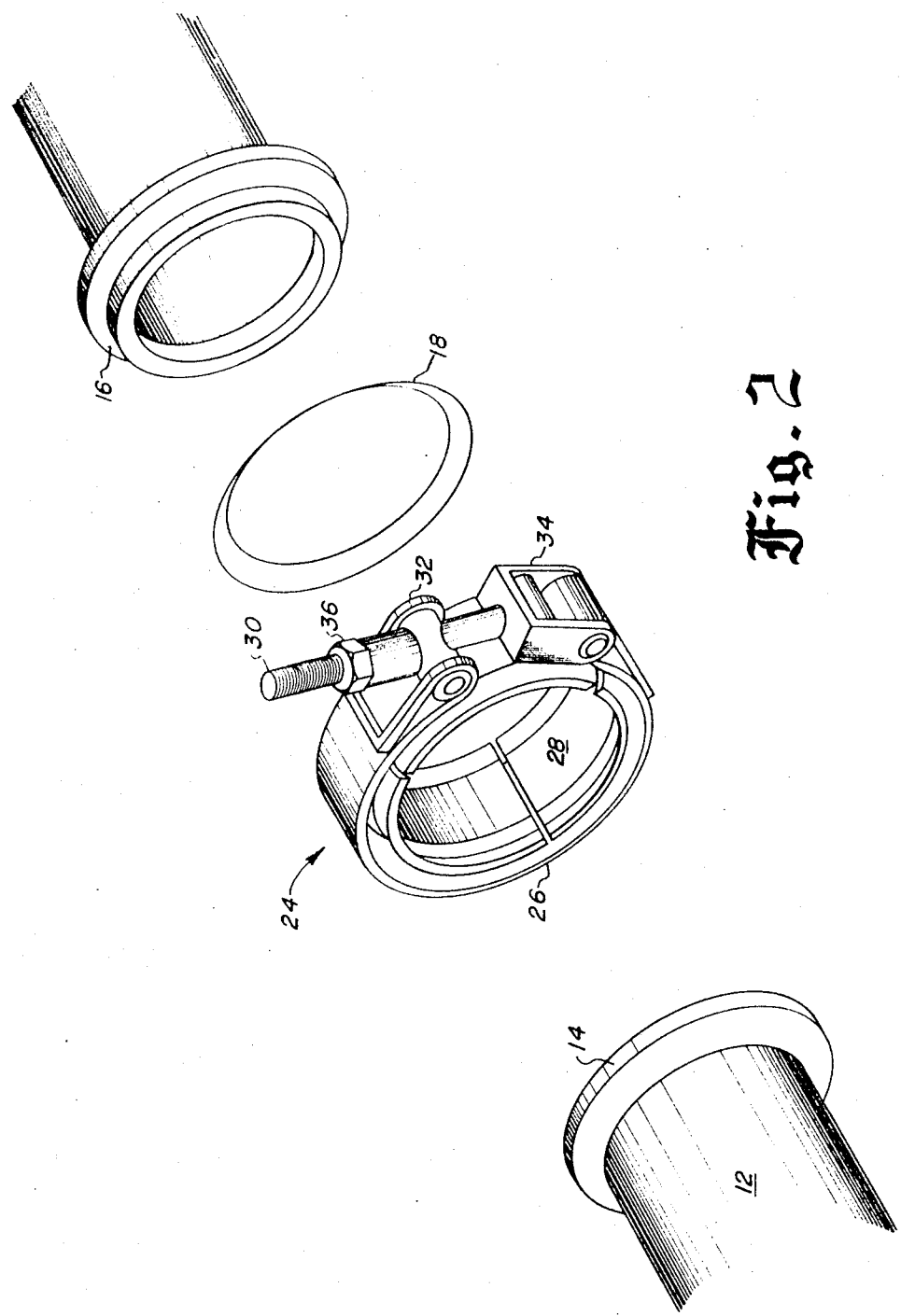
FIG. 2 is an isometric exploded view similar to FIG. 1 of a tube joint coupling exemplified by the prior art.

As previously noted, the prior art clamps, as seen in FIG. 2, accomplished this by meticulously tightening coupling nut 36 to a predetermined torque value. A further disadvantage in the prior art system was that quite a bit of space was wasted since T-bolt 30, trunnion 32, latch 34, and nut 36 were of necessity left in place on the joint, which in addition increased weight. Since the locations and uses to which such devices are put normally dictate "tight" or crowded areas, and since such uses are also normally extremely "weight" critical, the disadvantage is most important.

With use of the coupling 20 of the present invention this is no longer necessary. It is normally possible that a pair of pliers may be utilized to close, or bottom out, tips 56, 58. Occasionally, however, location of coupling 20 or other factors does not permit the use of pliers to be feasible or convenient in which case (as shown in FIG. 8) a jack screw latch 76 may be readily employed. As seen in FIG. 8 jack screw assembly 76 comprises a closed yoke member 78 having an internally threaded hole in shoulder 80, screw 82, being received and guided therein, and a reaction face 84 so that when assembly 76 is placed over coupling tips 56, 58 and screw 80 tightened, the tips are drawn gradually together until they eventually bottom out, thus aligning the retaining holes of C-sections 46 and 48 and permitting introduction of retaining pin 22 (not shown in this figure) into the opening afforded by the retaining holes. After the retaining pin 22 has been inserted, the clamp members 46, 48 are locked together and jack screw latch 76 may be removed. In addition, removal of the latching assembly requires that the locking pin 22 has been inserted, thus affording a 100 percent "foolproof" installation and assuring the pin 22 has been inserted and that the coupling cannot be left partially installed.

After insertion of locking pin 22, a cotter pin (not shown) may be inserted through pin 22 as a locking pin retaining means and may be wired if additional safety is requisite. The spring effect of the deformed seal 18 as noted applies a force on the joint which should normally frictionally hold the locking pin 22 in position, but the cotter pin and/or wiring does not increase the weight or or the space envelope appreciably and may be used as a safety feature in cases where vibration may be encountered.

Thus from a reading of the foregoing drawings and specification it will be seen that utilization of the herein described coupling of the invention device affords the advantages of a clamp which is more easily and quickly installed, more easily and quickly removed, cheaper to manufacture, less likely to fail, lighter in weight, less space consuming and is virtually impossible to improperly install.

Having thus described a preferred embodiment of our invention, we claim:

1. A clamping and coupling device for tubes having facing mating flanges on the ends to be joined, said device comprising:
   A. a pair of substantially C-shaped clamp elements having means for encompassingly mating with and drawing up the tube flanges, said elements pivotally secured one to another at one end thereof;
   said means for encompassingly mating with and drawing up the tube flanges comprises a V-shaped channel throughout substantially the length of each said clamp element, said V-shaped channel progressively narrowing and lengthening from a portion adjacent the end thereof toward a central sector of said clamp element so that there is provided a progressive ramp and camming surface providing a wedging action between said cooperating clamp elements and the mating flanges of the tubes;
   B. the ends opposite said pivotally secured ends each having cooperative means to permit securing said ends together when in the tube-coupling position;
   C. each said element having integral means adjacent the securing end thereof cooperatively engaging the other to gauge the proper positioning of said clamp elements relative to each other and to the mating tube flanges and to prevent additional closing action of said elements when said device is in the coupled-clamped position.

2. The device defined in claim 1 wherein:
said clamp element central sector comprises an arc of substantially 60° in each said clamp element and constitutes a full engagement portion of the V-groove encompassing substantially 120° of the circumference of the flanges forming said groove in two equal and opposite segments, said flanges having a diminishing length from a point on each side of said full engagement arc to a point adjacent each end of said clamping element thereby providing a ramp for the successive tightening of said clamping elements and the tube flanges.

3. The clamping device defined by claim 1 wherein:
said cooperative securing means comprises, in combination, a yoke-like extension on the first said C-shaped element to provide spaced-apart ear members, each said ear member defining a pin receiving aperture, a bar-like extension on the second said C-shaped element operative to be positioned between the yoke defined by said ears of said first C-shaped element, said bar defining a pin receiving aperture, said apertures aligned for the reception of pin securing means when said integral gauging means are cooperatively engaged.

* * * * *